G. R. McALLASTER.
MEANS AND METHOD OF MARKING PHOTOGRAPHIC FILMS.
APPLICATION FILED APR. 29, 1916.

1,260,415.

Patented Mar. 26, 1918.

Inventor:
George R. McAllaster
by Davis & Simms
his attorneys

UNITED STATES PATENT OFFICE.

GEORGE R. McALLASTER, OF ROCHESTER, NEW YORK.

MEANS AND METHOD OF MARKING PHOTOGRAPHIC FILMS.

1,260,415.  Specification of Letters Patent.  Patented Mar. 26, 1918.

Application filed April 29, 1916. Serial No. 94,421.

*To all whom it may concern:*

Be it known that I, GEORGE R. McALLASTER, a citizen of the United States, and resident of Rochester, in the county of Monroe and State of New York, have invented certain new and useful Improvements in Means and Methods of Marking Photographic Films, of which the following is a specification.

The present invention relates to photographic cameras and more particularly to the type in which provision is made for marking the sensitized material while it is in the camera for the purpose of identifying the sensitized material after it is removed from the camera, an object of this invention being to provide a construction which will permit the identification to be secured by breaking or rupturing the sensitized sheet without producing any bad effects upon the sensitized sheet. Another object of the invention is to produce a new method of marking the sensitized material. Still another object is to provide means on the camera for retaining a record of the exposures made. A still further object of the invention is to provide a method of marking films in photographic cameras so that the films may be identified.

To these and other ends, the invention consists of certain parts and combinations of parts all of which will be hereinafter described, the novel features being pointed out in the appended claims.

In the drawings:—

Figure 1:
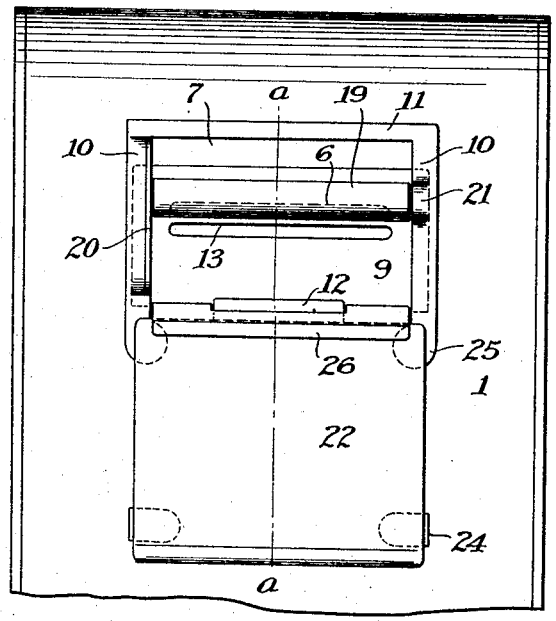
Figure 1 is a view of the back of a camera with the present invention attached thereto.
Figure 2:
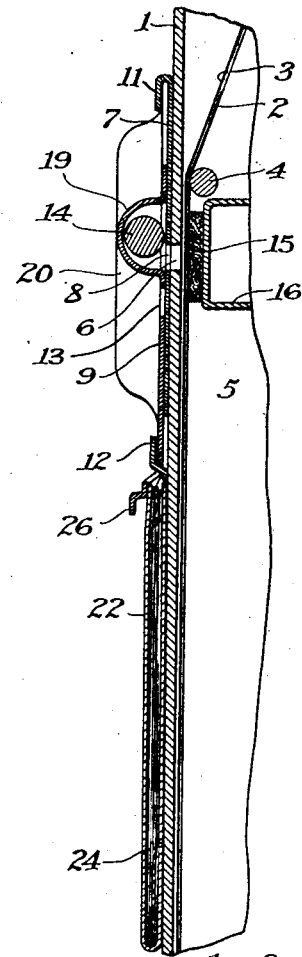
Fig. 2 is an enlarged section on the line *a—a*, Fig. 1.
Figure 3:
Fig. 3 is a detail view of the yielding material against which the film is pressed.

Referring more particularly to the drawing, 1 indicates the camera of the type in which a film 2 and a backing sheet 3 are passed from one roll chamber to another over rollers 4 and past an exposure chamber 5, only portions of these parts being shown in the drawings as they are of well known construction.

According to this invention, the back of the camera 1 is provided with a slot 6 transversely of the path of the travel of the film and to one side of the exposure chamber. To the back a plate 7 may be secured having an opening 8 coincident with the slot 6, said plate serving as a support for a slide cover or shutter 9 and, to this end, having opposite edges turned inwardly at 10 to overhang the shutter 9 and having also inwardly-turned portions 11 and 12 serving to limit the sliding movement of the shutter. The shutter may also be provided with a slot 13 adapted to register with the opening 6 in the camera back when the shutter is in one position, so that an instrument may be passed through the opening 6 to operate upon the film 2 and its backing sheet 3 in a manner to be hereafter more particularly pointed out.

Figure 4:
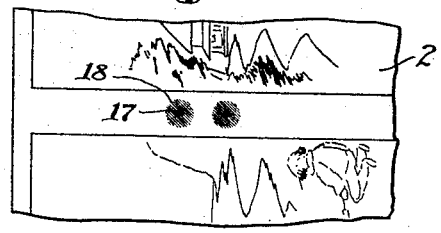
Fig. 4 is a detail view showing the manner in which the film or sensitized material is marked.
Figure 5:
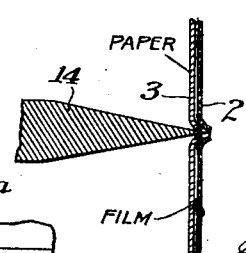
Fig. 5 is a detail view showing the manner in which the sharp instrument penetrates the backing sheet and the film.

This invention contemplates the breaking or rupturing of the film by an instrument introduced through the opening 6 in the camera casing 1. Preferably this instrument is in the form of a sharp pointed tool 14 of hard material, such as steel, which presses the backing sheet and the sensitized film against a device within the camera in such a manner that the film is bruised or perforated. In the embodiment shown, this device is in the form of a strip of felt or other soft yielding material 15 secured to the cross piece 16 which separates the exposure chamber 5 from one of the film roll chambers. Under normal conditions, the film travels over this strip of felt with slight engagement therewith, being held in such position by the adjacent roller 4, the felt thereby preventing the passage of light to the interior of the camera. The sharp instrument 14 is passed through the opening 6 and pressed against the backing sheet 3 until it penetrates the latter and the film due to the pressing of the film against the yielding surface 15. Upon the withdrawal of the instrument, light rays pass through the opening in the backing sheet and expose a portion of the film about the penetrated portion, as shown in Fig. 4, where 17 indicates the penetrating portion and 18 a circular exposed portion about the penetrated portion. This exposed portion acts to set out the penetrated portion from the rest of the film and also causes a picture taken from the film to have a white background about a black spot produced by the opening. By this invention, each film is identified by punctures, and these punctures are associated in a distinguishing manner on the different films. For instance, film No. (1) would be indicated by one punch, (2) by two punches, and so on until (12) is reached when three punches would again be used, one by itself and the other two separated from the one punch at a greater distance than between themselves. This method can be followed to mark any sized number on the film.

Figure 6:
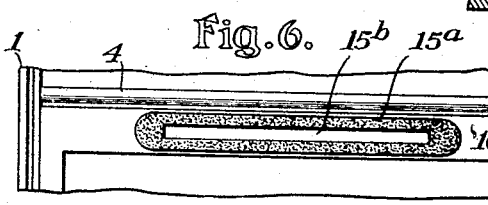
Fig. 6 is a detail view of a modification in which the yielding material is provided with an opening into which the sharp instrument enters after passing through the backing sheet and the film.

In the embodiment shown in Fig. 6, the device which coöperates with the penetrating tool 14 is in the form of a strip of felt 15$^a$ formed with a slot 15$^b$ in which the point of the tool enters.

The penetrating tool 14 is preferably arranged in a pocket 19 which is formed by bending the slide or shutter 9 at one side of the slot 13, to provide an open-ended pocket, one end of which is closed by a flange 20 on the plate 7, and the other end of which is closed by a portion 21 when the shutter 9 is in closed position.

It is desirable to make a record of each film and to this end a record device is provided on the camera preferably in the form of a book or tablet 22 on which may be recorded the date of the picture, the conditions under which the picture was taken, and any other suitable matter which is desirable to note about the picture, the record being identified with the picture by the number which is punched on the film. For holding the tablet lugs 24 and 25 may be carried by the camera casing to engage the under member of the cover of the tablet while the upper cover member has its free end lying so as to be engaged by an extension 26 on the shutter or slide 9 so that, when the shutter or slide 9 is opened in order to expose the backing sheet and to remove the penetrating instrument 14, the book or tablet will also be opened in order that a record may be made on the tablet.

Figure 7:
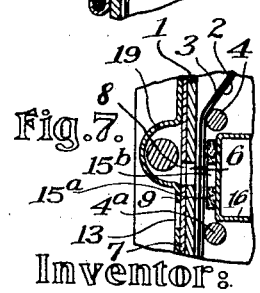
Fig. 7 is a detail view of another embodiment of the invention.

In the embodiment shown in Fig. 7 the felt 15 is arranged a short distance from the film by the two rollers 4 and 4$^a$, the roller 4$^a$ preventing the passage of light to the interior of the camera.

A camera constructed in accordance with this invention has an identifying means which becomes operative immediately that the puncture is made, making it unnecessary for the user to hold the camera to a strong light for a time after the puncturing operation. The method of surrounding the puncture by an exposed field permits the punctures to be distinguished from other punctures which might occur on the film. This identifying arrangement does not require a special form of film, or a special form of backing sheet, but the form heretofore commercially used may be employed.

What I claim as my invention and desire to secure by Letters Patent is:—

1. A film camera of the type adapted to use a roll film with a backing sheet, distinguished by the provision of an opening in the camera casing past which the film and its backing sheet travel with the backing sheet between the film and the opening, and a device in the camera opposite the opening on that side of the path of the film opposite the side on which the backing sheet travels, said device having provision for coöperating with a sharp instrument introduced through the opening to bruise or rupture the backing sheet and the film.

2. A film camera of the type using a roll film with a backing sheet, distinguished by the provision of an elongated opening in the wall of the camera casing extending transversely of the path of travel of the film and situated so that the backing sheet travels between the film and the opening, and a device in the camera opposite said opening on that side of the path of the film opposite that on which the backing sheet travels, said device having provision for coöperating with a sharp instrument introduced through the opening to bruise or rupture the backing sheet and the film.

3. In combination with a film camera having an opening in one of its walls through which a sharp instrument may be introduced and past which the film is caused to travel, a device on the opposite side of the film having provision for coöperating with the instrument to bruise or rupture the film, said device being spaced slightly from the film so as not to contact with the latter when said film is shifted.

4. The method of marking a film in a photographic camera in which a backing sheet is provided for the film, consisting of penetrating the backing sheet and the film from the backing sheet side by a sharp instrument to produce an opening in the backing sheet and the film so that light rays penetrate the opening in the backing sheet and strike a portion of the film about the penetrated portion of the film.

5. In combination with a camera having an opening therein for the introduction of a marking instrument for the sensitized material, a cover for covering said opening having a pocket for the marking instrument, said pocket being closed when the opening is closed and open when the opening is open.

6. In combination with a camera having an opening therein for the introduction of a marking instrument for the sensitized material, a cover for said opening, and a record holder held closed by said cover.

7. In combination with a camera having an opening therein for the introduction of a marking instrument, a slide cover for said opening, and a record holder having a hinged portion held in closed position by said slide cover.

GEORGE R. McALLASTER.

Copies of this patent may be obtained for five cents each, by addressing the "Commissioner of Patents, Washington, D. C."